US012681975B2

(12) United States Patent
Miao

(10) Patent No.: US 12,681,975 B2
(45) Date of Patent: Jul. 14, 2026

(54) TEXT CLASSIFICATION MODEL TRAINING METHOD, TEXT CLASSIFICATION METHOD, APPARATUS, DEVICE, STORAGE MEDIUM AND COMPUTER PROGRAM PRODUCT

(71) Applicant: Tencent Technology (Shenzhen) Company Limited, Shenzhen (CN)

(72) Inventor: Changyu Miao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 954 days.

(21) Appl. No.: 17/959,402

(22) Filed: Oct. 4, 2022

(65) Prior Publication Data

US 2023/0025317 A1     Jan. 26, 2023

Related U.S. Application Data

(63) Continuation of application No. PCT/CN2021/124335, filed on Oct. 18, 2021.

(30) Foreign Application Priority Data

Nov. 4, 2020     (CN) .......................... 202011217057.9

(51) Int. Cl.
*G06N 20/00*     (2019.01)
*G06F 16/31*     (2019.01)
(Continued)

(52) U.S. Cl.
CPC ............ *G06F 16/35* (2019.01); *G06F 16/316* (2019.01); *G06F 18/214* (2023.01)

(58) Field of Classification Search
CPC ...... G06F 16/35; G06F 16/316; G06F 18/214; G06F 16/353; G06F 18/2431; G06F 40/58; G06N 3/045; G06N 3/08
See application file for complete search history.

(56) References Cited

U.S. PATENT DOCUMENTS

2015/0356464 A1* 12/2015 Lin .......................... G06N 20/00
706/12
2017/0212890 A1* 7/2017 Akbik ..................... G06F 40/30
(Continued)

FOREIGN PATENT DOCUMENTS

CN          103488623 A     1/2014
CN          111598222 A     8/2020
(Continued)

OTHER PUBLICATIONS

Qiu, Siyuan, et al. "Easyaug: An automatic textual data augmentation platform for classification tasks." Companion proceedings of the web conference 2020. 2020 (Year: 2020).*
(Continued)

*Primary Examiner* — Andrew T McIntosh
(74) *Attorney, Agent, or Firm* — Sughrue Mion, PLLC

(57) ABSTRACT

The disclosure provides a text classification model training method, a text classification method, an apparatus, an electronic device, and a computer-readable storage medium, and relates to artificial intelligence technology. The text classification model training method includes: performing machine translation on a plurality of first text samples in a first language to obtain a plurality of second text samples in a second language different from the first language; training a first text classification model for the second language based on a plurality of third text samples in the second language and corresponding class labels; performing confidence-based filtering on the plurality of second text samples by the trained first text classification model; and training a second text classification model for the second language based on the filtered second text samples.

19 Claims, 8 Drawing Sheets

(51) Int. Cl.
G06F 16/35 (2019.01)
G06F 18/214 (2023.01)

(56) References Cited

U.S. PATENT DOCUMENTS

| | | | | |
|---|---|---|---|---|
| 2017/0323202 | A1* | 11/2017 | Wang | G06N 3/08 |
| 2018/0046619 | A1* | 2/2018 | Shi | G06N 3/0442 |
| 2019/0026356 | A1 | 1/2019 | Liu | |
| 2020/0302234 | A1* | 9/2020 | Walters | G06N 3/0985 |
| 2020/0335086 | A1* | 10/2020 | Paraskevopoulos ... | G06N 3/088 |
| 2021/0049700 | A1* | 2/2021 | Nguyen | G06N 3/09 |

FOREIGN PATENT DOCUMENTS

| | | |
|---|---|---|
| CN | 111813942 A | 10/2020 |
| CN | 111831821 A | 10/2020 |
| CN | 112214604 A | 1/2021 |
| JP | 2005-92253 A | 4/2005 |
| JP | 2018-26098 A | 2/2018 |

OTHER PUBLICATIONS

Shi, Lei, Rada Mihalcea, and Mingjun Tian. "Cross language text classification by model translation and semi-supervised learning." Proceedings of the 2010 Conference on Empirical Methods in Natural Language Processing. 2010 (Year: 2010).*

Howard, Jeremy, and Sebastian Ruder. "Universal language model fine-tuning for text classification." Proceedings of the 56th Annual Meeting of the Association for Computational Linguistics (vol. 1: Long Papers). 2018 (Year: 2018).*

Qi, Ye, et al. "When and why are pre-trained word embeddings useful for neural machine translation?." Proceedings of the 2018 Conference of the North American Chapter of the Association for Computational Linguistics: Human Language Technologies, vol. 2 (Short Papers). 2018 (Year: 2018).*

Office Action Issued Jun. 10, 2024 in Japanese Application No. 2023-514478.

International Search Report of PCT/CN2021/124335 dated Jan. 18, 2022 [PCT/ISA/210].

Written Opinion of PCT/CN2021/124335 dated Jan. 18, 2022 [PCT/ISA/237].

* cited by examiner

Server 100

Text to be classified in certain language

Class of text to be classified

Network 300

Text to be classified in certain language

Class of text to be classified

Terminal 200

XXXXXXXXXXXXXX
XXXXXXXXXXXXXX
XXXXXXXXXXXXXX
XXXXXX

The text belongs to entertainment class

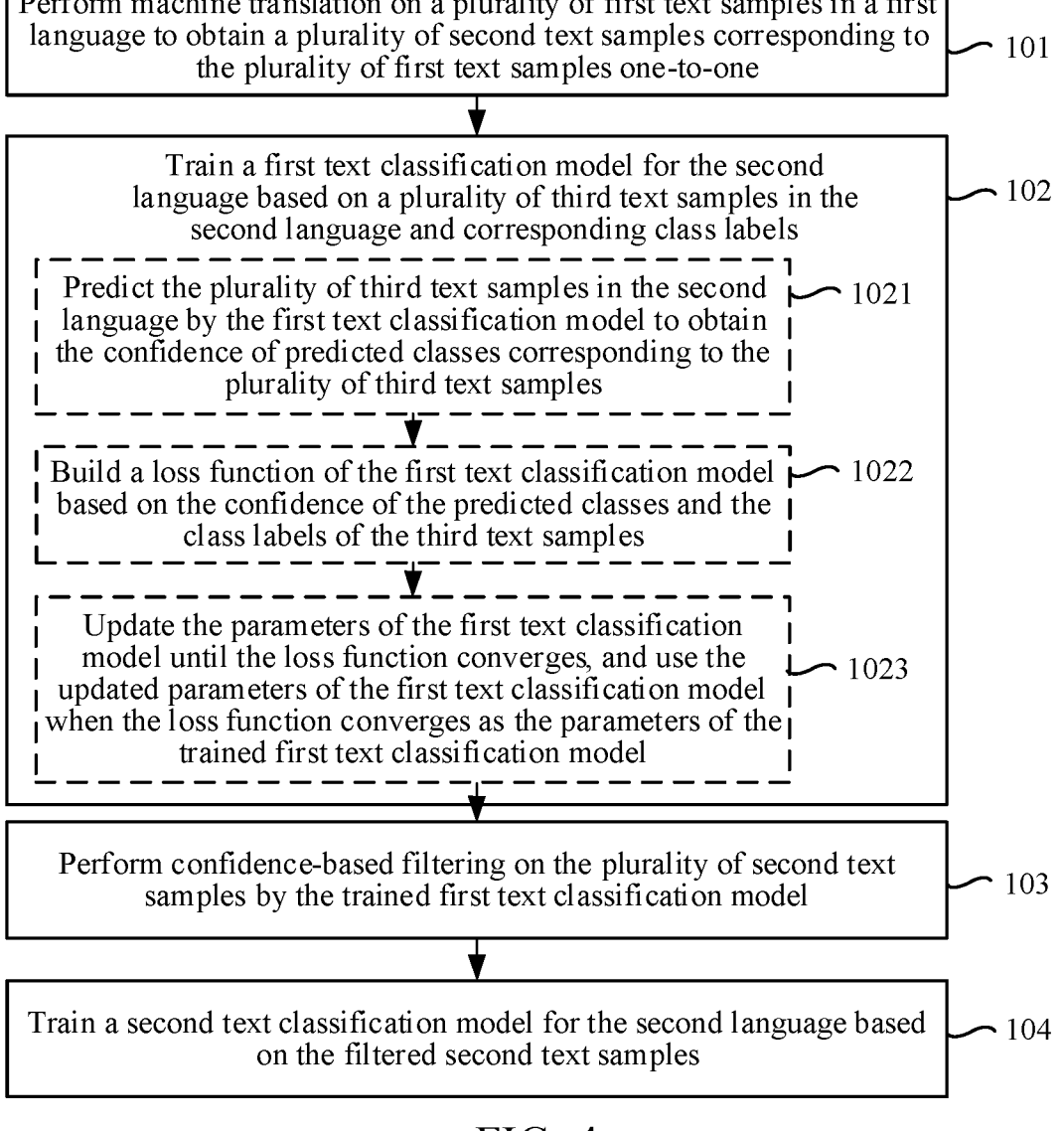

Perform machine translation on a plurality of first text samples in a first language to obtain a plurality of second text samples corresponding to the plurality of first text samples one-to-one ⟋ 101

Train a first text classification model for the second language based on a plurality of third text samples in the second language and corresponding class labels ⟋ 102

Predict the plurality of third text samples in the second language by the first text classification model to obtain the confidence of predicted classes corresponding to the plurality of third text samples ⟋ 1021

Build a loss function of the first text classification model based on the confidence of the predicted classes and the class labels of the third text samples ⟋ 1022

Update the parameters of the first text classification model until the loss function converges, and use the updated parameters of the first text classification model when the loss function converges as the parameters of the trained first text classification model ⟋ 1023

Perform confidence-based filtering on the plurality of second text samples by the trained first text classification model ⟋ 103

Train a second text classification model for the second language based on the filtered second text samples ⟋ 104

FIG. 4

Confidence

Encoding vector

TEXT CLASSIFICATION MODEL TRAINING METHOD, TEXT CLASSIFICATION METHOD, APPARATUS, DEVICE, STORAGE MEDIUM AND COMPUTER PROGRAM PRODUCT

CROSS-REFERENCE TO RELATED APPLICATION(S)

This application is a continuation application of International Application No. PCT/CN2021/124335, filed Oct. 18, 2021, which claims priority to Chinese Patent Application No. 202011217057.9, filed on Nov. 4, 2020, with the China National Intellectual Property Administration, the disclosures of which are incorporated by reference in their entireties.

FIELD

The disclosure relates to artificial intelligence technology, and in particular relates to a text classification model training method, a text classification method, an apparatus, an electronic device, a computer-readable storage medium, and a computer program product.

BACKGROUND

Artificial Intelligence (AI) is an integrated technology of computer science. By studying the design principles and implementation methods of various intelligent machines, the machines may have the functions of perception, reasoning and decision-making. AI technology is an integrated discipline, involving a wide range of fields, such as natural language processing technology, machine learning/deep learning and other major directions. With the development of technology, AI technology will be applied in more fields and of more and more important value.

A text classification model, which can identify the class to which a text belongs, is an important application in the field of AI. Text classification models are widely used in news recommendation, intention recognition systems, etc., that is, text classification models are basic components of these complex systems.

However, text classification models in the related art are applicable for a certain language. For text classification in other languages, a text classification model has a problem of lack of labeled samples in other languages, and cannot successfully perform text classification tasks in other languages.

SUMMARY

Embodiments of the disclosure provide a text classification model training method, a text classification method, an apparatus, an electronic device, a computer-readable storage medium, and a computer program product, which may automatically acquire cross-language text samples and improve the accuracy of text classification.

The technical solutions of the embodiments of the disclosure include the followings.

An aspect of an example embodiment of the disclosure provides a text classification model training method, including:

performing machine translation on a plurality of first text samples in a first language to obtain a plurality of second text samples corresponding to the plurality of first text samples one-to-one;

the plurality of second text samples being in a second language different from the first language;

training a first text classification model for the second language based on a plurality of third text samples in the second language and corresponding class labels;

performing confidence-based filtering on the plurality of second text samples by the trained first text classification model; and training a second text classification model for the second language based on the filtered second text samples;

a network depth of the second text classification model being greater than a network depth of the first text classification model.

An aspect of an example embodiment of the disclosure provides a text classification method, including:

acquiring a text to be classified;

the text to be classified being in a second language different from the first language;

encoding the text to be classified by a second text classification model with a network depth greater than a network depth of a first text classification model, to obtain an encoding vector of the text to be classified; and nonlinearly mapping the encoding vector of the text to be classified, to obtain the class corresponding to the text to be classified;

the second text classification model being trained by using text samples in the second language filtered by the first text classification model, and the text samples in the second language being obtained by performing machine translation on text samples in the first language.

An aspect of an example embodiment of the disclosure provides a text classification model training apparatus, including at least one memory configured to store program code; and at least one processor configured to read the program code and operate as instructed by the program code, the program code comprising:

translation code configured to cause the at least processor to perform machine translation on a plurality of first text samples in a first language to obtain a plurality of second text samples corresponding to the plurality of first text samples one-to-one;

first training code configured to cause the at least processor to train a first text classification model for the second language based on a plurality of third text samples in the second language and corresponding class labels;

filtering code configured to cause the at least processor to perform confidence-based filtering on the plurality of second text samples by the trained first text classification model; and second training code configured to cause the at least processor to train a second text classification model for the second language based on the filtered second text samples; the network depth of the second text classification model being greater than a network depth of the first text classification model.

An aspect of an example embodiment of the disclosure provides a text classification apparatus, including at least one memory configured to store program code; and at least one processor configured to read the program code and operate as instructed by the program code, the program code comprising:

acquisition code configured to cause the at least processor to acquire a text to be classified; the text to be classified being in a second language different from the first language; and processing code configured to cause the at least processor to encode the text to be classified by a second text classification model with a network depth greater than a network depth of a first text classification model, to obtain an encoding vector of the text to be classified, and nonlinearly map the encoding vector of the text to be classified, to obtain the class corresponding to the text to be classified; the second text classification model being trained by using text samples in the second language filtered by the first text classification model, and the text samples in the second language being obtained by performing machine translation on text samples in the first language.

An aspect of an example embodiment of the disclosure provides an electronic device for training a text classification model, the electronic device including:

at least one memory, configured to store executable instructions; and at least one processor, configured to execute the instructions stored in the memory to perform the text classification model training method, or the text classification method provided by the embodiments of the disclosure when executing the executable instructions stored in the memory.

An aspect of an example embodiment of the disclosure provides a computer-readable storage medium storing executable instructions, the executable instructions, when executed by a processor, implementing the text classification model training method, or the text classification method provided by the embodiments of the disclosure.

An aspect of an example embodiment of the disclosure provides a computer program product including a computer program or instructions, the computer program or instructions being used for, when executed by a processor, implementing the text classification model training method, or the text classification method provided by the embodiments of the disclosure.

BRIEF DESCRIPTION OF THE DRAWINGS

FIGS. 3-5 are schematic flowcharts of a text classification model training method provided by an embodiment of the disclosure.

DETAILED DESCRIPTION

Figure 1:
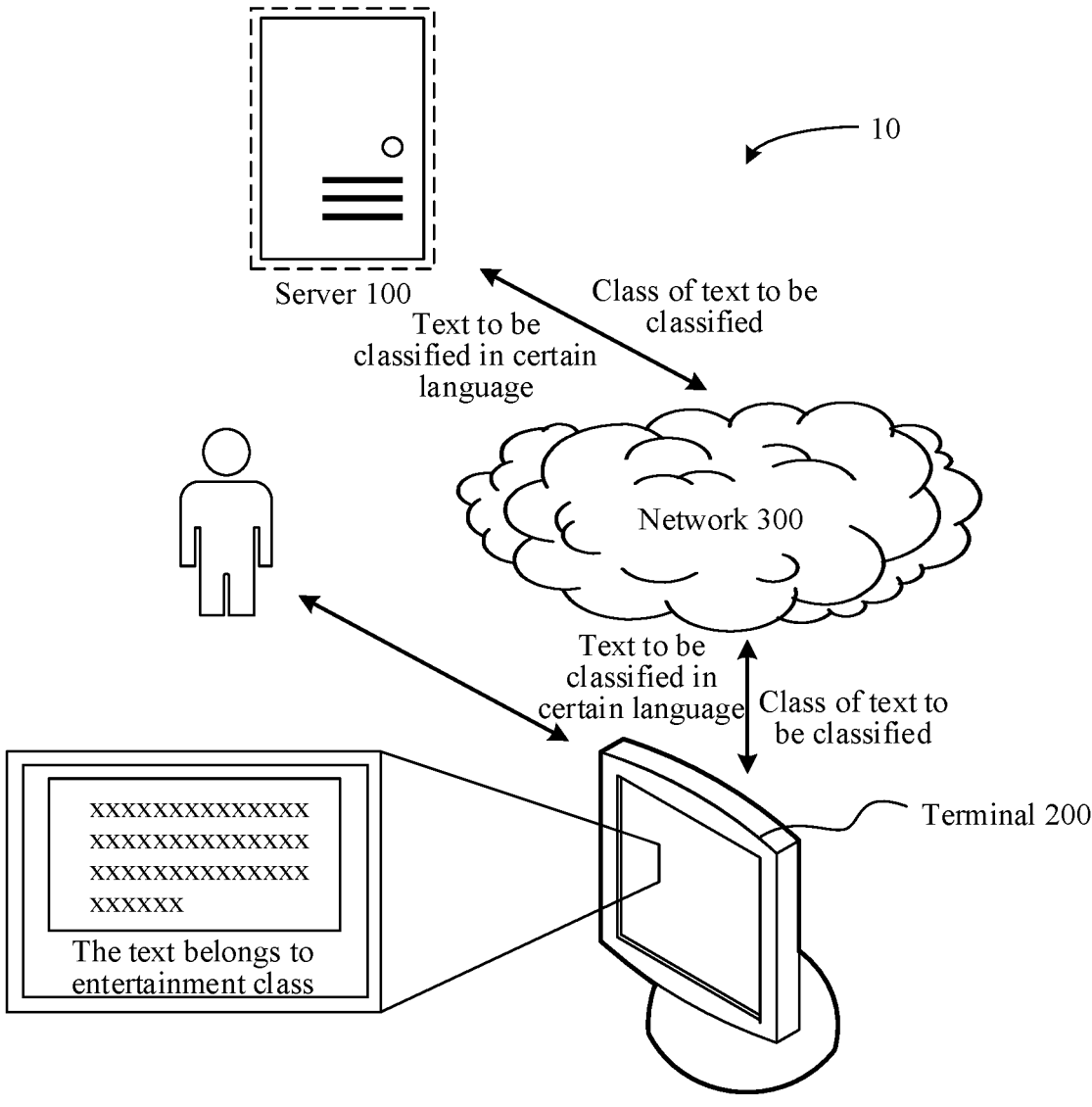
FIG. 1 is a schematic diagram of a scenario of a text classification system provided by an embodiment of the disclosure.

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following descriptions, the term such as "first" and "second" is merely intended to distinguish similar objects but does not necessarily indicate a specific order of an object. It would be understood that "first" or "second" is interchangeable in terms of a specific order or sequence if permitted, so that the embodiments of the disclosure described herein may be implemented in a sequence in addition to the sequence shown or described herein.

Unless otherwise defined, meanings of all technical and scientific terms used in this specification are the same as those usually understood by a person skilled in the art to which the disclosure belongs. Terms used in this specification are merely intended to describe objectives of the embodiments of the disclosure, but are not intended to limit the disclosure.

Before the embodiments of the disclosure are further described in detail, nouns and terms involved in the embodiments of the disclosure are described. The nouns and terms provided in the embodiments of the disclosure are applicable to the following explanations.

1) Convolutional Neural Networks (CNN): A class of Feedforward Neural Networks (FNN) including convolution computation and having a deep structure, is one of representative algorithms of deep learning. Convolutional neural networks are capable of representation learning and may perform shift-invariant classification on input images according to hierarchical structures thereof.

2) Cross-language few shot text classification: In a case that a context in language A is migrated to a context in language B, and there is a small budget for labeling samples in language B, large-scale labeling of texts in language B may be achieved by only a small number of labeled texts in language B and a large number of labeled texts in language A, and text classification in language B may be achieved by training a text classification model through the large-scale labeling of the texts in language B.

3) Cross-language zero shot text classification: In a case that a context in language A is migrated to a Context in language B, and there is a lack of budget (no labor or short product promotion time) for labeling samples in language B, large-scale labeling of texts in language B may be achieved through a large number of labeled texts in language A, and text classification in language B may be achieved by training a text classification model through the large-scale labeling of the texts in language B.

Text classification is widely used in content-related products, e.g., news classification, article classification, intent classification, information flow products, forums, communities and e-business. In general, text classification is for texts in a certain language, e.g., Chinese, or English. However, in a case that a product needs to expand its business in other languages, the problem of insufficient labeled texts will be encountered in the early stage of the product. For example, when a news reading product is promoted from a Chinese market to an English market, it is necessary to quickly label news in the English field accordingly. When the positive and negative sentiment of comments of a Chinese user is analyzed, as the number of users increases, or when a product is promoted to overseas markets, many comments that are not in Chinese will appear and also need to be labeled with the corresponding sentiment polarity.

Although from a longer time scale, a certain amount of labeled data may be gradually accumulated for these texts in other languages by manual operations and other methods and then model training and prediction may be performed, in the early stage, hand labeling of texts alone is time-consuming and labor-intensive, which is not conducive to fast iteration of a product. Therefore, in the early stage, it is hoped that automatic labeling of a large number of texts may be achieved through algorithms and accumulation of labeled texts in the existing language.

In the related art, few shot text classification or zero shot text classification is used for the same language, that is, the problem of insufficient labeled samples is solved only for the same language, and there is still a lack of cross-language text classification.

To solve the above problem, the embodiments of the disclosure provide a text classification model training method, a text classification method, an apparatus, an electronic device, a computer-readable storage medium, and a computer program product, which may automatically acquire cross-language text samples and improve the accuracy of text classification.

The text classification model training method and the text classification method provided by the embodiments of the disclosure may be independently implemented by a terminal or a server, or be implemented collaboratively by a terminal and a server, for example, a terminal alone undertakes the text classification model training method described below; or a terminal sends a text classification request for a certain language to a server, and the server executes the text classification model training method according to the received text classification request for the certain language, and performs the text classification task for the language based on the trained text classification model.

An electronic device for text classification model training provided by an embodiment of the disclosure may be various types of terminal devices or servers. The servers may be independent physical servers, a server cluster or a distributed system including a plurality of physical servers, or a cloud server that provides cloud computing services. The terminal may be a smartphone, a tablet computer, a notebook computer, a desktop computer, a smart speaker, a smartwatch, a vehicle-mounted device, or the like, but is not limited thereto. The terminal and the server may be directly or indirectly connected in a wired or wireless communication manner. This is not limited in the disclosure.

As an example, a server may be a server cluster deployed in the cloud, and open AI as a Service (AIaaS) to users. An AIaaS platform splits several types of common AI services and provides independent or packaged services in the cloud. Such a service mode is similar to an AI-themed mall. All users may access one or more AI services provided by the AIaaS platform via application programming interfaces.

For example, one of the AIaaS may be a text classification model training service, that is, a text classification model training program provided by an embodiment of the disclosure is packaged in a server in the cloud. A user calls the text classification model training service in the cloud service via the terminal (on which a client runs, e.g., a news client, or a reading client), so that the server deployed in the cloud may call the packaged text classification model training program. Based on first text samples in a first language, second text samples in a second language different from the first language are acquired by a machine translation model, and the second text samples are filtered by a first text classification model. A second text classification model is trained by the filtered second text samples. Text classification is performed by the trained second text classification model for subsequent text input, e.g., news applications, reading applications, etc. For example, for a news application, when a text is from news in English, the class of news to be recommended, e.g., entertainment news, or sports news, is determined by the trained second text classification model (for classifying news in English). Therefore, based on the class of the news, news to be recommended is filtered to obtain and display news for recommendation to a user, to perform targeted news recommendation. For a reading application, when a text is an article in Chinese, the class of articles to be recommended, e.g., chicken soup for the soul, legal articles, or educational articles, is determined by the trained second text classification model (for classifying articles in Chinese). Therefore, articles to be recommended are filtered based on the class of the articles to obtain and display articles for recommendation to a user, to perform targeted article recommendation.

FIG. 1 is a schematic diagram of a scenario of a text classification system 10 provided by an embodiment of the disclosure. Referring to FIG. 1, a terminal 200 is connected to a server 100 via a network 300, and the network 300 may be a wide area network or a local area network, or a combination thereof.

The terminal 200 (on which a client runs, e.g., a news client) may be configured to acquire a text to be classified in a certain language. For example, a developer inputs a text to be classified in a certain language via the terminal, and the terminal automatically acquires a text classification request for a certain language.

In some embodiments, a text classification model training plug-in may be embedded in the client running in the terminal to implement the text classification model training method locally on the client. For example, after acquiring a text to be classified in a second language different from a first language, the terminal 200 calls the text classification model training plug-in to implement the text classification model training method. Second text samples (in the second language) corresponding to first text samples (in the first language) are acquired by a machine translation model, and the second text samples are filtered by a first text classification model. A second text classification model is trained by the filtered second text samples, and text classification is performed based on the trained second text classification model for subsequent text input, e.g., news applications, reading applications, etc.

In some embodiments, the terminal 200 calls a text classification model training interface of the server 100 (which may be provided in the form of a cloud service, that is, a text classification model training service) after receiving a text classification request for a certain language. The server 100 acquires second text samples (in a second language) corresponding to first text samples (in a first language) by a machine translation model, and the second text samples are filtered by a first text classification model. A second text classification model is trained by the filtered second text samples, and text classification is performed based on the trained second text classification model for subsequent text input, e.g., news applications, reading applications, etc.

Figure 2:
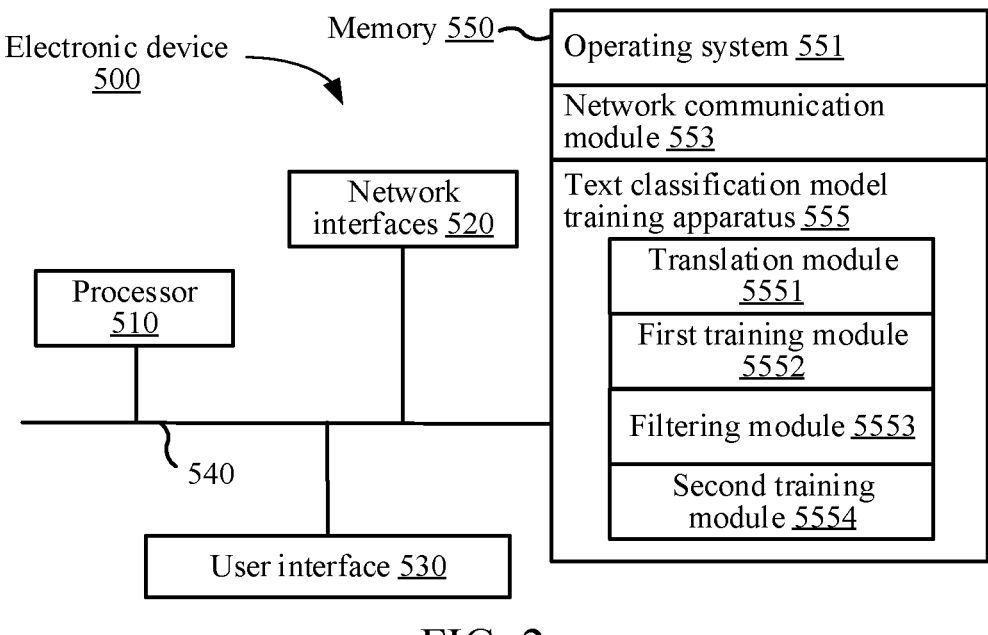
FIG. 2 is a schematic structural diagram of an electronic device for training a text classification model provided by an embodiment of the disclosure.

The structure of an electronic device for text classification model training provided by an embodiment of the disclosure is described below. FIG. 2 is a schematic structural diagram of an electronic device 500 for text classification model training provided by an embodiment of the disclosure. Referring to FIG. 2, taking the electronic device 500 as a server as an example, the electronic device 500 for text classification model training shown in FIG. 2 includes: at least one processor 510, a memory 550, at least one network interface 520, and a user interface 530. All the components in the electronic device 500 may be coupled together by using a bus system 540. It would be understood that the bus system 540 may be configured to implement connection and communication between the components. In addition to a data bus, the bus system 540 further comprises a power bus, a control bus, and a state signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 550 comprises a volatile memory or a non-volatile memory, or may comprise both a volatile memory and a non-volatile memory. The non-volatile memory may be a read-only memory (ROM), and the volatile memory may be a random access memory (RAM). The memory 550 described in this embodiment of the disclosure is to include any other suitable type of memories. The memory 550 may include one or more storage devices away from the processor 510 in a physical position.

In some embodiments, the memory 550 may store data to support various operations. Examples of the data include a program, a module, and a data structure, or a subset or a superset thereof, which are described below by using examples.

An operating system 551 includes a system program configured to process various basic system services and perform a hardware-related task, such as a framework layer, a core library layer, or a driver layer, and is configured to implement various basic services and process a hardware-based task.

A network communication module 553 is configured to access other computing devices via one or more (wired or wireless) network interfaces 520, exemplary network interfaces 520 including: Bluetooth, Wireless Fidelity (WiFi), Universal Serial Bus (USB), etc.

In some embodiments, the text classification model training apparatus provided by an embodiment of the disclosure may be implemented in software, e.g., the text classification model training plug-in in the terminal as described above, or the text classification model training service in the server as described above. Of course, the text classification model training apparatus provided by an embodiment of the disclosure may be provided as various software embodiments, including, but not limited to, application programs, software, software modules, scripts or codes, etc.

FIG. 2 shows a text classification model training apparatus 555 stored in the memory 550, which may be software in the form of programs, plug-ins, etc., e.g., a text classification model training plug-in, including a translation module 5551, a first training module 5552, a filtering module 5553 and a second training module 5554, the translation module 5551, the first training module 5552, the filtering module 5553 and the second training module 5554 being configured to implement a text classification model training function provided by an embodiment of the disclosure.

Figure 3:
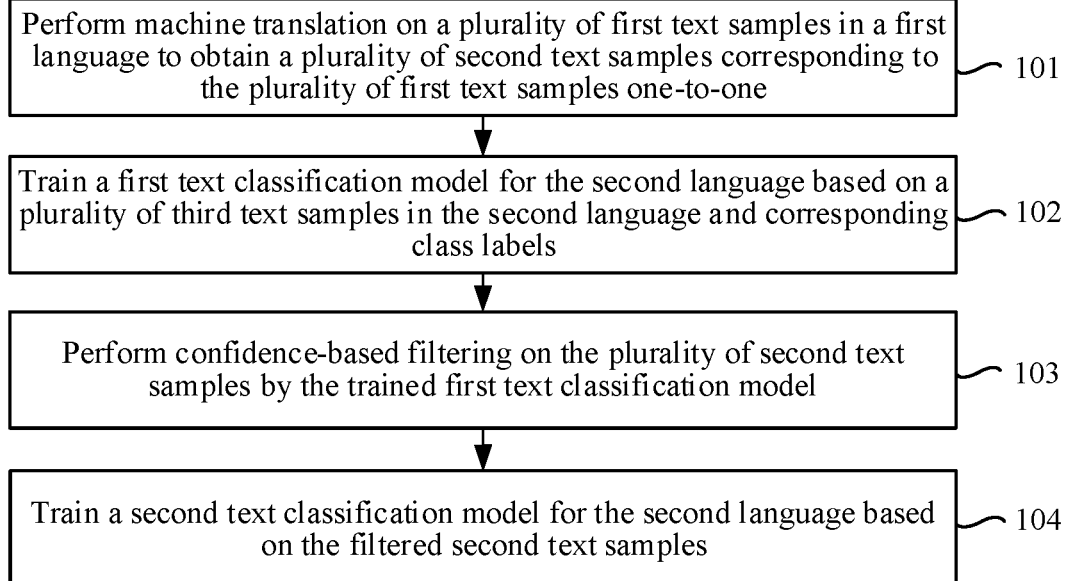

As described above, the text classification model training method provided by an embodiment of the disclosure may be implemented by various types of electronic devices. FIG. 3 is a schematic flowchart of a text classification model training method provided by an embodiment of the disclosure, which is described in conjunction with the steps shown in FIG. 3.

In the following steps, the network depth of a second text classification model is greater than that of a first text classification model, that is, the text classification capability of the second text classification model is higher than that of the first text classification model. Therefore, the number of text samples required for training the second text classification model is greater than that required for training the first text classification model.

In the following steps, first text samples are in a first language, and second text samples and third text samples are in a second language different from the first language, for example, the first text samples are in Chinese, and the second text samples and the third text samples are in English.

Step 101: perform machine translation on a plurality of first text samples in a first language to obtain a plurality of second text samples corresponding to the plurality of first text samples one-to-one;

For example, when a developer inputs a text classification instruction in the second language via a terminal, the terminal automatically acquires the text classification request for the second language, and sends the text classification request for the second language to a server. After receiving the text classification request for the second language, the server acquires a large number of labeled first text samples in the first language different from the second language from a sample database, and calls a machine translation model to perform machine translation on the plurality of first text samples to obtain a plurality of second text samples corresponding to the plurality of first text samples one-to-one. Class labeling of the second text samples inherits class labeling corresponding to the first text samples, that is, hand labeling is not required, and the problem caused by bulk hand labeling is solved.

Step 102: train a first text classification model for the second language based on a plurality of third text samples in the second language and corresponding class labels.

There is no specific sequence required between step 101 and step 102. That is, step 102 does not need to be performed after step 101. For example, after receiving the text classification request for the second language, the server may acquire a small number of labeled third text samples from a sample database, and train the first text classification model by the plurality of third text samples and corresponding class labels, so that the trained first text classification model may perform text classification based on the second language.

In some embodiments, the training a first text classification model for the second language based on a plurality of third text samples in the second language and corresponding class labels includes: train the first text classification model for a $t^{th}$ time based on the plurality of third text samples in the second language and corresponding class labels; perform confidence-based filtering on the plurality of second text samples for the $t^{th}$ time by the first text classification model trained for the $t^{th}$ time; train the first text classification model for a $t+1^{th}$ time based on the filtering results of t times of training, the plurality of third text samples and corresponding class labels; and use the first text classification model trained for a $T^{th}$ time as the trained first text classification model; t being a sequentially increasing positive integer in a value range of $1 \leq t \leq T-1$, and T being an integer greater than 2 for indicating the total number of iterative training times.

For example, based on the plurality of third text samples in the second language and corresponding class labels, the first text classification model is iteratively trained to filter out more high-quality third text samples by the gradually optimized first text classification model, to perform subsequent reinforcement training and train the second text classification model.

Figure 6:
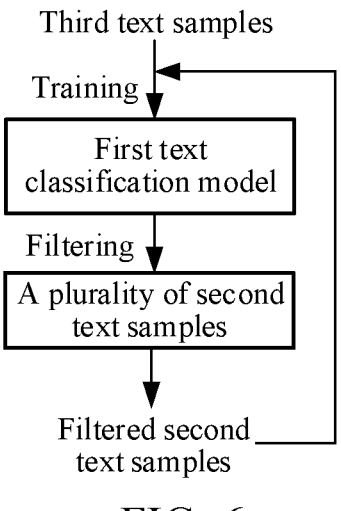
FIG. 6 is a schematic flowchart of an iterative training provided by an embodiment of the disclosure.

FIG. 6 is a schematic flowchart of an iterative training provided by an embodiment of the disclosure. As shown in FIG. 6, an embodiment of the disclosure may train the first text classification model for a first time based on the plurality of third text samples in the second language and corresponding class labels; perform confidence-based filtering on the plurality of second text samples for the first time by the first text classification model trained for the first time; train the first text classification model for a second time based on the filtering result of the first time of training, the plurality of third text samples and corresponding class labels; perform confidence-based filtering on the second text samples except the filtering result of the first time of training by the first text classification model trained for the second time; and train the first text classification model for a third time based on the filtering results of the first and second times of training, the plurality of third text samples and corresponding class labels. An embodiment of the disclosure may iterate the above training process until the first text classification model is trained for a $T^{th}$ time, and use the first text classification model trained for the $T^{th}$ time as the trained first text classification model.

FIG. 4 is a schematic flowchart of a text classification model training method provided by an embodiment of the disclosure. FIG. 4 shows that step 102 in FIG. 3 may be implemented by steps 1021-1023 shown in FIG. 4. Step 1021 may predict the plurality of third text samples in the second language by the first text classification model to obtain the confidence of predicted classes corresponding to the plurality of third text samples. Step 1022 may build a loss function of the first text classification model based on the confidence of the predicted classes and the class labels of the third text samples. Step 1023 may update the parameters of the first text classification model until the loss function converges, and use the updated parameters of the first text classification model when the loss function converges as the parameters of the trained first text classification model.

For example, after the value of the loss function of the first text classification model is determined based on the confidence of the predicted classes and the class labels of the third text samples, whether the value of the loss function of the first text classification model exceeds a preset threshold may be determined. When the value of the loss function of the first text classification model exceeds the preset threshold, an error signal of the first text classification model is determined based on the loss function of the first text classification model. The error information is back-propagated in the first text classification model, and the model parameters of each layer are updated during propagation.

The back-propagation is described herein. Training sample data is inputted into an input layer of a neural network model, passes through a hidden layer, and finally, and reaches an output layer, and a result is outputted, which is a forward propagation process of the neural network model. Because there is an error between an output result of the neural network model and an actual result, an error between the output result and an actual value is calculated, and the error is back-propagated from the output layer to the hidden layer until it is propagated to the input layer. In the back-propagation process, the value of the model parameter is adjusted according to the error. The foregoing process is continuously iterated until convergence is achieved. The first text classification model belongs to a neural network model.

In some embodiments, the predicting the plurality of third text samples in the second language by the first text classification model to obtain the confidence of predicted classes corresponding to the plurality of third text samples includes: perform, by the first text classification model, the following processing on any third text sample of the plurality of third text samples: encode the third text sample to obtain an encoding vector of the third text sample; fuse the encoding vector of the third text sample to obtain a fusion vector; and nonlinearly map the fusion vector to obtain the confidence of the predicted class corresponding to the third text sample.

For example, the first text classification model is a fast text classification model (fasttext). The first text classification model in the embodiments of the disclosure is not limited to fasttext. Fasttext includes an input layer, a hidden layer and an output layer. Fasttext may be quickly trained with a small number of third text samples, so that fasttext may quickly perform text classification tasks in a second language. For example, encode a third text sample by an input layer to obtain the encoding vector of the third text sample; then, fuse the encoding vector of the third text sample by the hidden layer to obtain a fusion vector; and finally, perform non-linear mapping on the fusion vector by the output layer (that is, perform mapping by an activation function (e.g. softmax)) to obtain the confidence of the predicted class corresponding to the third text sample.

In some embodiments, the first text classification model includes a plurality of cascaded activation layers. The nonlinearly mapping the fusion vectors to obtain the confidence of the predicted classes corresponding to the third text samples includes: map the fusion vectors by the first activation layer of the plurality of cascaded activation layers; output the mapping result of the first activation layer to the subsequent cascaded activation layer, and continue mapping by the subsequent cascaded activation layer and outputting the mapping result until the mapping result is outputted to the last activation layer; and use the activation result outputted by the last activation layer as the confidence of the predicted classes corresponding to the third text samples.

Figure 7:
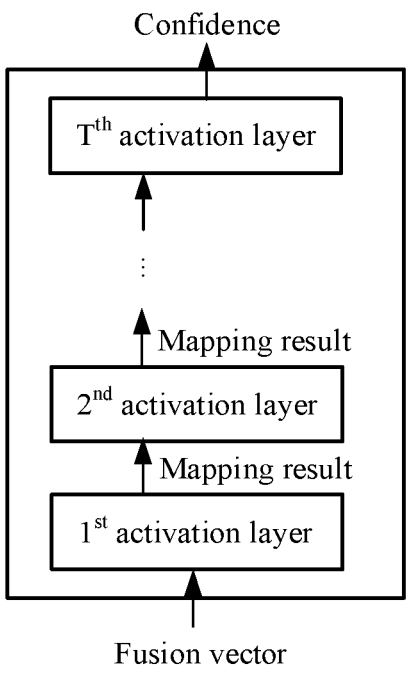
FIG. 7 is a schematic diagram of hierarchical softmax provided by an embodiment of the disclosure.

FIG. 7 is a schematic diagram of hierarchical softmax provided by an embodiment of the disclosure. As shown in FIG. 7, by performing activation operation by hierarchical softmax to obtain the confidence of the predicted classes, one-time activation operation may be avoided, and the computational complexity is reduced by the multi-layer activation operation. For example, by hierarchical softmax including T activation layers, perform hierarchical softmax operation once in each activation layer, e.g., map a fusion vector by the first activation layer to obtain the first mapping result, output the first mapping result to the second activation layer, map the first mapping result by the second activation layer to obtain the second mapping result, and so on, until the mapping result is outputted to a $T^{th}$ activation layer, and use the activation result outputted by the $T^{th}$ activation layer as the confidence of the predicted class corresponding to the third text sample. T is the total number of the activation layers.

In some embodiments, the encoding the third text sample to obtain an encoding vector of the third text sample includes: perform window sliding on the third text sample to obtain a plurality of fragment sequences; the size of a window being N, and N being a natural number; map the plurality of fragment sequences based on a thesaurus to obtain sequence vectors corresponding to the plurality of fragment sequences; and combine the sequence vectors corresponding to the plurality of fragment sequences to obtain the encoding vector of the third text sample.

Following the above example, if the fragment sequences include N characters, the performing window sliding on the third text sample to obtain a plurality of fragment sequences includes performing the following processing on an $i^{th}$ character in the third text sample: acquire the $i^{th}$ character to an $i+N-1^{th}$ character in the third text sample; and combine the $i^{th}$ character to the $i+N-1^{th}$ character, and use the combination results as the fragment sequences; $0 \leq i \leq M-N+1$, M being the number of characters in the third text samples, and M being a natural number. Therefore, more favorable encoding vectors may be generated for rare characters. In a thesaurus, even if a character does not appear in a training corpus, an encoding vector corresponding to the character granularity window may still be constructed from a character granularity window, and the first text classification model may also learn some information about local character orders, so that the first text classification model maintains the character order information during training.

Following the above example, if the fragment sequences include N words, the performing window sliding on the third text sample to obtain a plurality of fragment sequences includes performing the following processing on a $i^{th}$ word in the third text sample: acquire the $i^{th}$ word to a $j+N-1^{th}$ word in the third text sample; and combine the $i^{th}$ word to the $j+N-1^{th}$ word, and use the combination results as the fragment sequences; $0 \leq j \leq K-N+1$, K being the number of words in the third text sample, and K being a natural number. Therefore, more favorable encoding vectors may be generated for rare words (or sentence). In a thesaurus, even if a sentence does not appear in a training corpus, an encoding vector corresponding to the word granularity may still be constructed from a word granularity window, and the first text classification model may also learn some information about local word orders, so that the first text classification model maintains the word order information during training.

Step 103: perform confidence-based filtering on the plurality of second text samples by the trained first text classification model.

For example, after the server obtains the trained first text classification model through the third text samples, confidence-based filtering may be performed on the plurality of second text samples by the trained first text classification model to filter out high-quality second text samples, and further a second text classification model is trained through the high-quality second text samples.

In some embodiments, the performing confidence-based filtering on the plurality of second text samples by the trained first text classification model includes performing the following processing on any second text sample of the plurality of second text samples: predict the second text sample by the trained first text classification model to obtain the confidence of a plurality of predicted classes corresponding to the second text sample; determine the class label of the first text sample corresponding to the second text sample as the class label of the second text sample; and use the second text sample exceeding a confidence threshold as the filtered second text sample based on the confidence of the plurality of predicted classes corresponding to the second text sample and the class label of the second text sample.

For example, encode a second text sample by the trained first text classification model to obtain an encoding vector of the second text sample. Fuse the encoding vector of the second text sample to obtain a fusion vector. Nonlinearly map the fusion vector to obtain the confidence of a plurality of predicted classes corresponding to the second text sample. Determine the predicted class that matches the class label of the second text sample from the plurality of predicted classes corresponding to the second text sample. When the confidence of the matched predicted class exceeds a confidence threshold, use the second text sample as the filtered second text sample.

Step 104: train a second text classification model for the second language based on the filtered second text samples.

For example, after a large number of high-quality second text samples are filtered by the trained first text classification model, a server automatically constructs cross-language text samples (that is, the second text samples in a second language, which have the class labels of the corresponding first text samples and do not require human labeling). A second text classification model is trained by a large number of high-quality second text samples, so that the trained second text classification model may perform accurate text classification based on the second language and improve the accuracy of text classification in the second language.

Since sufficient second text samples may be obtained for training a second text classification model by the training method of the embodiments of the disclosure, in the embodiments of the disclosure, the second text classification model may be trained only by using the filtered second text samples.

After a server obtains the trained second text classification model, in response to a text classification request for a second language, the text to be classified is classified, that is, the text to be classified is encoded by the trained second text classification model to obtain an encoding vector of the text to be classified, the encoding vector of the text to be classified is nonlinearly mapped to obtain the class corresponding to the text to be classified, and subsequent text input, e.g., news applications, reading applications, etc. may also be performed through the class corresponding to the text to be classified.

Figure 5:
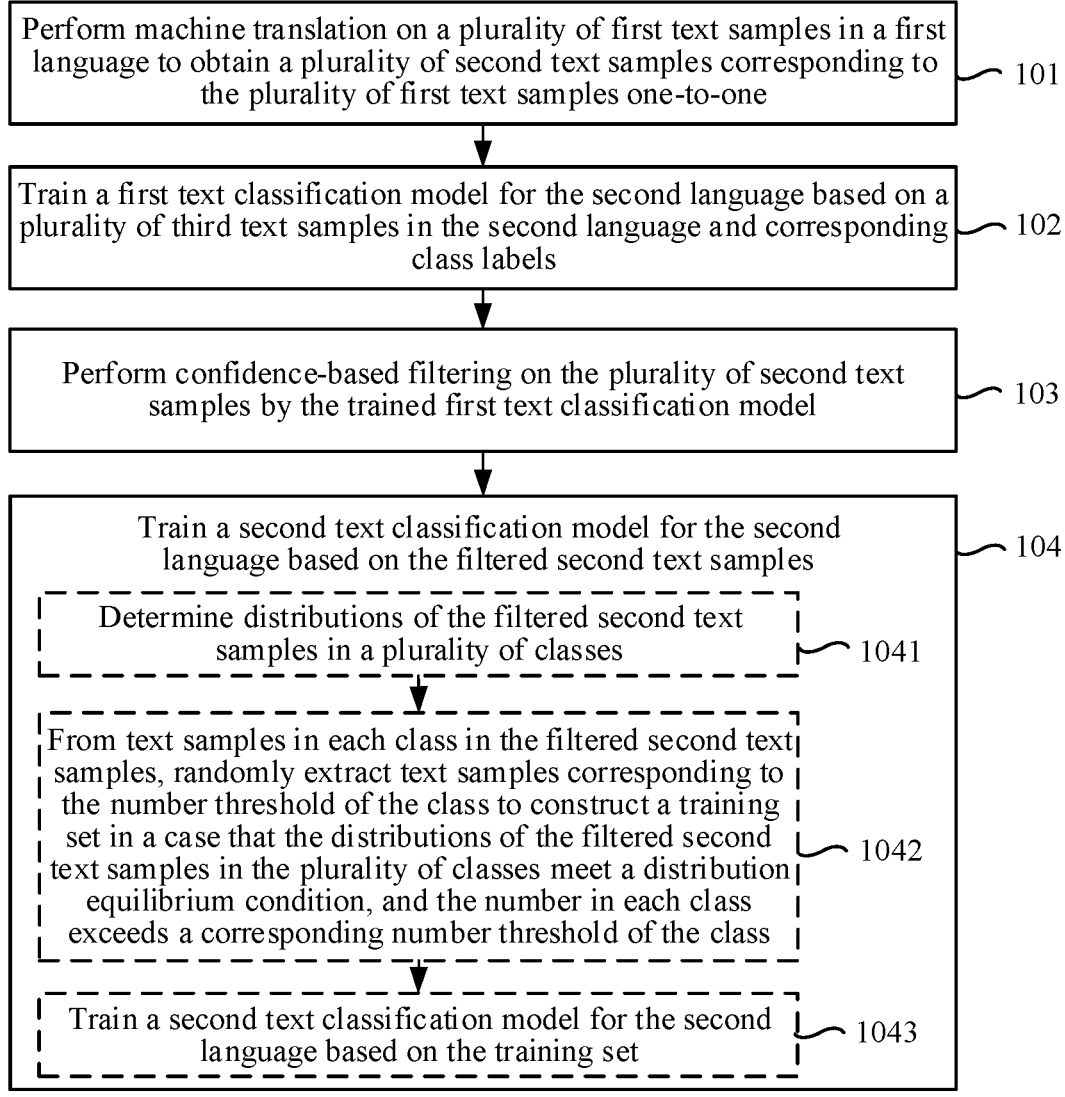

FIG. 5 is a schematic flowchart of a text classification model training method provided by an embodiment of the disclosure. FIG. 5 shows that step 104 in FIG. 3 may be implemented by steps 1041-1043 shown in FIG. 5. Step 1041 may determine distributions of the filtered second text samples in a plurality of classes. Step 1042 may, from text samples in each class in the filtered second text samples, randomly extract text samples corresponding to a number threshold of the class to construct a training set in a case that the distributions of the filtered second text samples in the plurality of classes meet a distribution equilibrium condition, and the number of the filtered second text samples in each class exceeds a corresponding number threshold of the class. Step 1043 may train a second text classification model for the second language based on the training set.

For example, after a server obtains a large number of second text samples for training a second text classification model, the distributions of the filtered second text samples in a plurality of classes are analyzed to determine whether a distribution equilibrium condition is met, e.g., a condition related to a jitter of the number in different classes. For example, a mean square error is used for measuring the jitter of the number in different classes. The larger the jitter, the more uneven the distributions of text samples in the plurality of classes. From text samples in each class in the filtered second text samples, text samples corresponding to the number threshold of the class are extracted to construct a training set to improve the text classification accuracy in a case that the distributions of the filtered second text samples in the plurality of classes meet a distribution equilibrium condition, and the number of the filtered second text samples in each class exceeds a corresponding number threshold of the class.

In some embodiments, the training a second text classification model for the second language based on the filtered second text samples includes: expand, based on synonyms, the second text samples in the classes with less distributions (or less even distributions), so that the distributions of the expanded second text samples in a plurality of classes meet the distribution equilibrium condition in a case that the distributions of the filtered second text samples in a plurality of classes do not meet a distribution equilibrium condition; construct a training set based on the expanded second text samples; and train a second text classification model for the second language based on the training set.

In some embodiments, the training the second text classification model may include: expand, based on synonyms, the second text samples in the corresponding class such that the number of the expanded second text samples in each class exceeds a corresponding number threshold of the class in a case that the number of the filtered second text samples in each class is less than the corresponding number threshold of the class; and construct a training set based on the expanded second text samples.

The specific expansion process is as follows: perform the following processing on a plurality of third text samples and the filtered second text samples: match a thesaurus (including the correspondence between various synonyms) with words in a text sample, to obtain the matching words corresponding to the words in the text sample; replace the words in the text sample with the matching words to obtain a new text sample; and use the class label corresponding to the text sample as the class label of the new text sample. By replacing the synonyms, the text samples in the second language may be greatly expanded to perform training of the second text classification model.

In some embodiments, the training a second text classification model for the second language based on the filtered second text samples includes: construct a training set based on a plurality of third text samples and the filtered second text samples, and train a second text classification model for the second language based on the training set.

For example, the constructing a training set based on a plurality of third text samples and the filtered second text samples includes: traverse each class of the filtered second text samples, and perform the following processing: randomly extract third text samples in the same class from the plurality of third text samples to supplement the second text samples in the same class, to update the filtered second text samples in a case that the number of the second text samples in a class is less than a threshold of the class; and construct a training set based on the updated filtered second text samples.

Following the above example, the text samples may be supplemented by the third text samples in a case that the number of text samples in some classes is small, or the distributions in some classes are uneven. For example, in a case that the number of second text samples in a class is less than the threshold of the class, it means that the number of the text samples in this class is small, and third text samples in this class may be randomly extracted from a plurality of third text samples and supplemented to the second text samples in this class to update the filtered second text samples, thereby obtaining sufficient text samples in this class in the second text samples.

In some embodiments, a corresponding number of text samples may be matched according to a computing power of the second text classification model for performing appropriate training, to avoid the problem of overfitting that can be caused by training a second classification model with a large number of samples. Before training a second text classification model for the second language based on the filtered second text samples, an embodiment of the disclosure may determine a target number of samples matching the computing power that may be used for training the second text classification model according to the correspondence between the computing power of the text classification model and the number of text samples that may be operated in a unit time; and filter out text samples corresponding to the target number of samples as samples for training the second text classification model for the second language from the training set constructed based on the filtered second text samples.

In some embodiments, the training a second text classification model for the second language based on the filtered second text samples includes: predict the filtered second text samples by the second text classification model to obtain the predicted classes corresponding to the filtered second text samples; build a loss function of the second text classification model based on the predicted classes corresponding to the filtered second text samples and the corresponding class labels; and update the parameters of the second text classification model until the loss function converges, and use the updated parameters of the second text classification model when the loss function converges as the parameters of the trained second text classification model.

For example, after the value of the loss function of the second text classification model is determined based on the predicted classes corresponding to the filtered second text sample and the corresponding class labels, whether the value of the loss function of the second text classification model exceeds a preset threshold may be determined. An error signal of the second text classification model is determined based on the loss function of the second text classification model in a case that the value of the loss function of the second text classification model exceeds the preset threshold. The error information is back-propagated in the second text classification model, and the model parameters of each layer are updated during propagation.

In some embodiments, the second text classification model includes a plurality of cascaded encoders; and the predicting the filtered second text samples by the second text classification model to obtain the predicted classes corresponding to the filtered second text samples includes: perform the following processing on any text sample in the filtered second text samples: encode the text sample by the first encoder of the plurality of cascaded encoders; output the encoding result of the first encoder to the subsequent cascaded encoder, and continue encoding by the subsequent cascaded encoder and outputting the encoding result until the encoding result is outputted to the last encoder; use the encoding result outputted by the last encoder as the encoding vector corresponding to the text sample; and nonlinearly map the encoding vector of the text sample to obtain the predicted class corresponding to the text sample.

Figure 8:
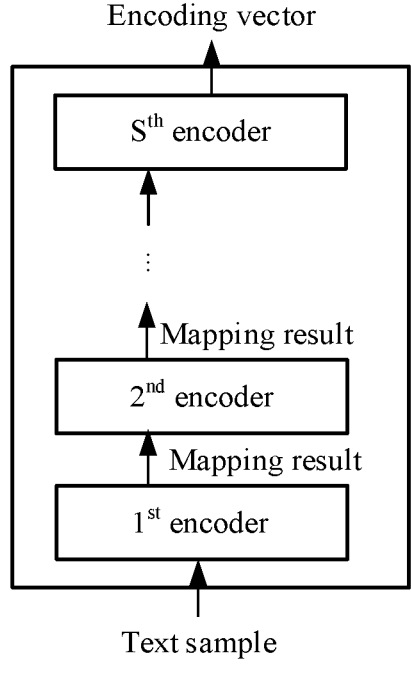
FIG. 8 is a schematic diagram of a cascaded encoder provided by an embodiment of the disclosure.

FIG. 8 is a schematic diagram of a cascaded encoder provided by an embodiment of the disclosure. As shown in FIG. 8, rich feature information of the text samples may be extracted by performing encoding operations with the cascaded encoders. For example, an embodiment of the disclosure may encode the text sample by the first encoder to obtain the first encoding result, output the first encoding result to the second encoder, encode the first encoding result by the second encoder to obtain the second encoding result, and so on, until the encoding result is outputted to an $S^{th}$ encoder, and finally nonlinearly map the encoding vector of the text sample to obtain the predicted class corresponding to the text sample. S is the total number of the encoders.

Following the above example, the continuing encoding and outputting the encoding result in the subsequent cascaded encoder may include: perform the following processing by a $y^{th}$ encoder of the plurality of cascaded encoders: perform self-attention processing on the encoding result of a $y-1^{th}$ encoder to obtain a $y^{th}$ self-attention vector; perform residual connection on the $y^{th}$ self-attention vector and the encoding result of the $y-1^{th}$ encoder to obtain a $y^{th}$ residual vector; nonlinearly map the $y^{th}$ residual vector to obtain a $y^{th}$ mapping vector; and perform residual connection on the $y^{th}$ mapping vector and the $y^{th}$ residual vector, use the result of the residual connection as the encoding result of the $y^{th}$ encoder, and output the encoding result of the $y^{th}$ encoder to a $y+1^{th}$ encoder; y being a sequentially increasing positive integer in a value range of $2 \leq y \leq H-1$, and H being an integer greater than 2 for indicating the number of the plurality of cascaded encoders.

After the trained second text classification model is acquired, text classification in a second language is performed by the trained second text classification model by a text classification method as follows: acquire a text to be classified; the text to be classified being in a second language different from a first language; encode the text to be classified by a second text classification model with a network depth greater than that of a first text classification model, to obtain an encoding vector of the text to be classified; and nonlinearly map the encoding vector of the text to be classified, to obtain the class corresponding to the text to be classified; the second text classification model being obtained by training text samples in the second language filtered by the first text classification model, and the text samples in the second language being obtained by performing machine translation on text samples in the first language.

Following the above example, the second text classification model includes a plurality of cascaded encoders; perform the following processing on the text to be classified: encode the text to be classified by the first encoder of the plurality of cascaded encoders; output the encoding result of the first encoder to the subsequent cascaded encoder, and continue encoding by the subsequent cascaded encoder and outputting the encoding result until the encoding result is outputted to the last encoder; use the encoding result outputted by the last encoder as the encoding vector of the text to be classified; and nonlinearly map the encoding vector of the text to be classified, to obtain the class corresponding to the text to be classified.

For example, rich feature information of the text to be classified may be extracted by performing encoding operations with the cascaded encoders. For example, an embodiment of the disclosure may encode the text to be classified by the first encoder to obtain the first encoding result, output the first encoding result to the second encoder, encode the first encoding result by the second encoder to obtain the second encoding result, and so on, until the encoding result is outputted to the $S^{th}$ encoder, and finally nonlinearly map the encoding vector of the text to be classified to obtain the class corresponding to the text to be classified. S is the total number of the encoders.

Following the above example, the continuing encoding and outputting the encoding result in the subsequent cascaded encoder may include: perform the following processing by the $y^{th}$ encoder of the plurality of cascaded encoders: perform self-attention processing on the encoding result of the $y-1^{t}$ encoder to obtain the $y^{th}$ self-attention vector; perform residual connection on the $y^{th}$ self-attention vector and the encoding result of the $y-1^{th}$ encoder to obtain the $y^{th}$ residual vector; nonlinearly map the $y^{th}$ residual vector to obtain the $y^{th}$ mapping vector; and perform residual connection on the $y^{th}$ mapping vector and the $y^{th}$ residual vector, use the result of the residual connection as the encoding result of the $y^{th}$ encoder, and output the encoding result of the $y^{th}$ encoder to the $y+1^{th}$ encoder; y being a sequentially increasing positive integer in a value range of $2 \leq y \leq H-1$, and H being an integer greater than 2 for indicating the number of the plurality of cascaded encoders.

The following describes an exemplary application of this embodiment of the disclosure in an example application scenario.

Text classification is widely used in content-related products, e.g., news classification, article classification, intent classification, information flow products, forums, communities and e-business, to perform text recommendation, emotional management, etc. based on the classes of text classification. In general, text classification is for texts in a certain language, e.g., Chinese, or English. In a case that a product needs to expand its business in other languages, for example, a news reading product is promoted from a Chinese market to an English market, when a user is reading news, news may be recommended based on the labels of English news, and English news that meets the user's interests may be recommended to the user. When the positive and negative sentiment of comments of a Chinese user is analyzed, and a product is promoted to overseas markets, the user may be appropriately emotionally managed based on the labels of English comments to prevent the user from continuously generating negative emotions.

A text classification model training method and a text classification method provided by the embodiments of the disclosure are described in detail in the following in conjunction with the above scenarios. The sample size of language B is increased by samples of language A by using an existing machine translation model. However, since the texts translated by an algorithm have certain deviations and errors, high-quality samples are selected by an active learning method from the translated texts for subsequent training.

The text classification model training method and the text classification method provided by the embodiments of the disclosure are specifically described in the following. The methods include A) data preparation, B) algorithm framework, and C) prediction:

A) Data Preparation

Figure 9:
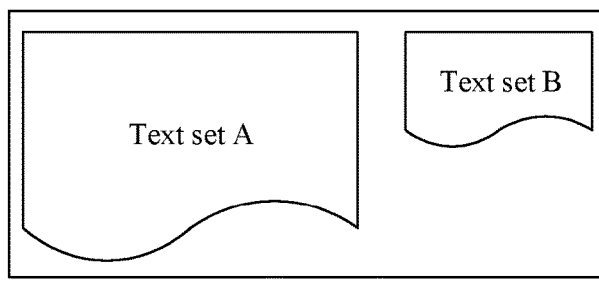
FIG. 9 is a schematic diagram of a text set A and a text set B provided by an embodiment of the disclosure.

The embodiments of the disclosure may be used in a situation without a large number of samples (without labels), where a large-scale pre-trained model cannot be obtained to extract text content. FIG. 9 is a schematic diagram of a text set A and a text set B provided by an embodiment of the disclosure. As shown in FIG. 9, in the embodiments of the disclosure, there are a partial text set A (Text A, a text set in language A) (including first text samples) and a small text set B (Text B, a text set in language B) (including third text samples), wherein Text A and Text B are samples with class labels. Compared with Text A, Text B has only a small number of labels and accordingly small proportion.

The labeled samples in Text A are denoted as <X_A, Y>, and in Text B as <X_B, Y>, where X_A represents a text in Text A, X_B represents a text in Text B, and the labels of Text A and Text B are common and are represented by Y. For example, class 0 (Y=0) represents entertainment news, and class 1 (Y=1) represents sports news. The 0 and 1 here are universal and unrelated to the language.

B) Algorithm Frame

The algorithm frame in the embodiments of the disclosure includes: 1) sample reinforcement, 2) active learning, and 3) reinforcement training. The sample reinforcement, active learning, and reinforcement training are described in detail below:

1) Sample Reinforcement

Figure 10:
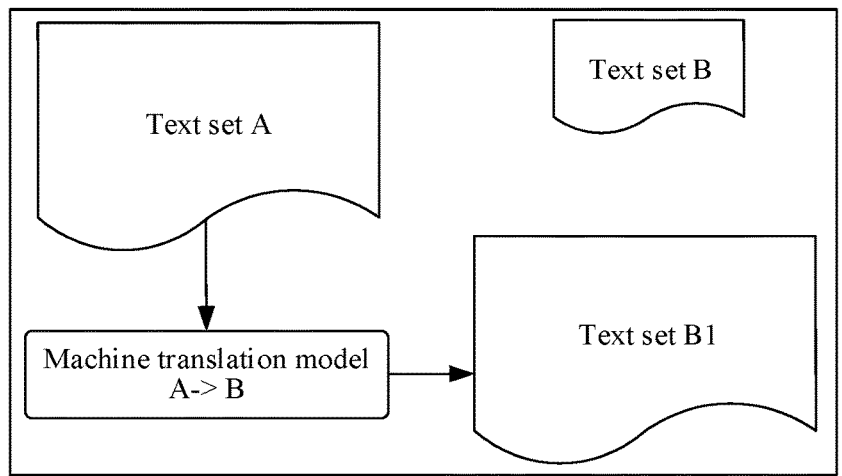
FIG. 10 is a schematic diagram of a text set B1 provided by an embodiment of the disclosure.

FIG. 10 is a schematic diagram of a text set B1 provided by an embodiment of the disclosure. As shown in FIG. 10, with the help of the machine translation model (for translating language A into language B), each text X_A in language A in Text A is translated into a text in language B to form the corresponding text set B1 (Text B1, the text set in language B formed by translation).

By the method of sample reinforcement, two types of labeled texts are obtained, one type is the original sample set Text B with a small number of human labels which are very accurate; and the other type is the sample set Text B1 (including second text samples) obtained after translation by the machine translation model, and having a large number of labels (corresponding to those in Text A). Text B1 may include noise, errors, etc., and is not as accurate as Text B.

2) Active Learning

Figure 11:
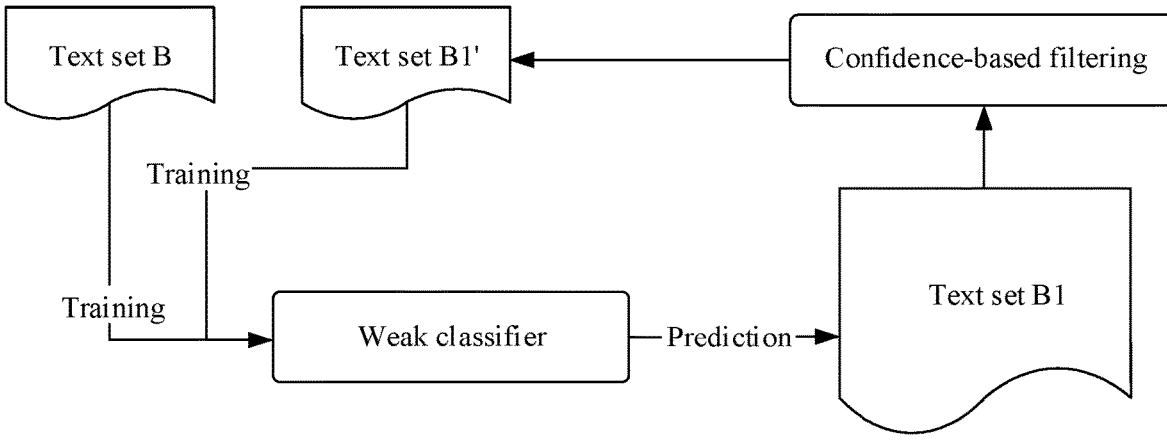
FIG. 11 is a schematic flowchart of active learning provided by an embodiment of the disclosure.

FIG. 11 is a schematic flowchart of active learning provided by an embodiment of the disclosure. To filter out high-quality samples from Text B1, an active learning method is used, and the whole process is shown in FIG. 11:

Step 1: Use the human labeled Text B to train a weak classifier (a first text classification model) (for example, a shallow classifier such as fasttext), apply the weak classifier to Text B1 for prediction, and filter out samples with higher confidence from Text B1. For example, if the confidence threshold is set to 0.8, and the confidence of a label Y=2 predicted by a sample X_B1 in Text B1 is 0.87 (greater than 0.8), consider that the class of the sample X_B1 is 2 to obtain a labeled training sample <X_B1, Y=2>.

Step 2: Form a new training sample set (text set B1', Text B1') with the high-confidence, labeled samples, continue to train a weak classifier based on Text B1' and Text B, repeat step 1 after the training, and apply the weak classifier to the remaining samples in the filtered Text B1 (the remaining samples are obtained after high-confidence samples are selected from Text B1).

Step 3: Stop the iterative training when the confidence obtained by predicting the samples in Text B1 is no longer higher than the specified confidence threshold, that is, it is considered that the remaining samples in the filtered Text B1 are samples of poor quality.

3) Reinforcement Training

Figure 12:
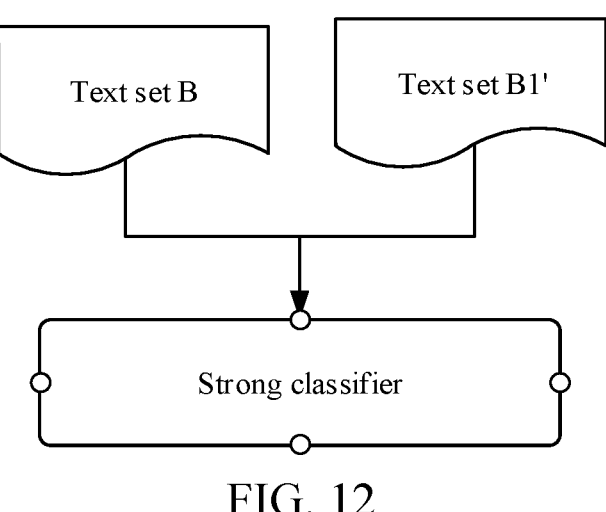
FIG. 12 is a schematic flowchart of reinforcement learning provided by an embodiment of the disclosure.

FIG. 12 is a schematic flowchart of reinforcement learning provided by an embodiment of the disclosure. As shown in FIG. 12, mix Text B' and Text B obtained in the above steps to train a strong classifier (or a second text classification model) (e.g., a deep neural network (BERT, Bidirectional Encoder Representations from Transformers)).

C) Prediction

The trained strong classifier is used as the final text classification model for text classification in language B. For example, in a case that a news reading product is promoted from a Chinese market to an English (language B) market, English news is quickly labeled with corresponding labels by the trained strong classifier. When a user is reading news, news may be recommended based on the labels of the English news, and English news that meets the user's interests may be recommended to the user. When the positive and negative sentiment of comments of a Chinese user is analyzed, and a product is promoted to overseas markets (language B), many comments that are not in Chinese, e.g., English comments, will appear. The English comments are quickly labeled with corresponding sentiment labels by the trained strong classifier. When the user makes a comment, the user may be appropriately emotionally managed based on the label of the English comment, so as to prevent the user from continuously generating negative emotions.

To sum up, the text classification model training method and text classification method provided by the embodiments of the disclosure acquire the second text samples in language B different from language A by the machine translation model, and filter the second text samples by the weak classifier, thereby automatically acquiring cross-language text samples and solving the problem caused by the lack of text samples. Moreover, the strong classifier is trained by the filtered high-quality text samples, so that the strong classifier may perform accurate text classification and improve the accuracy of the text classification.

So far, the text classification model training method provided by the embodiments of the disclosure has been described with reference to the exemplary applications and implementations of the server provided by the embodiments of the disclosure. An embodiment of the disclosure further provides a text classification model training apparatus. In an embodiment, functional modules in the text classification model training apparatus may be cooperatively implemented by hardware resources of an electronic device (e.g., a terminal device, a server or a server cluster), computing resources of a processor, communication resources (e.g., for supporting realization of communication in various ways such as optical cables and cellular), and a memory. FIG. 2 shows an example embodiment in which a text classification model training apparatus 555 is stored in a memory 550. The text classification model training apparatus may be software in the form of a program, a plug-in, etc., for example, a software module designed in a programming language such as C/C++ or Java, application software designed in a programming language such as C/C++ or Java, or a special software module, an application program interfaces, a plug-in, a cloud service, etc. in a large software system. Different implementations are illustrated below.

Example 1: The Text Classification Model Training Apparatus being a Mobile Application Program or Module The text classification model training apparatus 555 in some example embodiments of the disclosure may be provided as a software module designed using a programming language such as software C/C++ or Java, embedded in various mobile applications based on Android or iOS or other systems (stored in a storage medium of the mobile terminal as executable instructions, and executed by a processor of the mobile terminal), therefore, the relevant information recommendation tasks may be completed by directly using the computing resources of the mobile terminal, and the processing results may be transmitted to a remote server regularly or irregularly in various ways of network communication, or stored locally in the mobile terminal.

Example 2: The Text Classification Model Training Apparatus being a Server Application Program or Platform The text classification model training apparatus 555 in some example embodiments of the disclosure may be provided as application software or a special software module in a large software system designed using a programming language such as C/C++ or Java, operated at a server side (stored in a server-side storage medium as executable instructions, and executed by a server-side processor), and the relevant information recommendation tasks are completed by the computing resources of the server.

The embodiments of the disclosure may also be provided as a distributed and parallel computing platform including a plurality of servers, with a customized and easy-to-interact web (Web) interface or other user interfaces (UI), forming an information recommendation platform (for recommendation lists), etc. for use by individuals, groups or units.

Example 3: The Text Classification Model Training Apparatus being a Server-Side Application Program Interface (API) or Plug-In The text classification model training apparatus 555 in the embodiments of the disclosure may be provided as a server-side API or plug-in to be called by users to execute the text classification model training method according to the embodiments of the disclosure, and embedded in various application programs.

Example 4: The Text Classification Model Training Apparatus being a Mobile Device Client API or Plug-In The text classification model training apparatus 555 in the embodiments of the disclosure may be provided as a mobile device API or plug-in to be called by users to execute the text classification model training method according to the embodiments of the disclosure.

Example 5: The Text Classification Model Training Apparatus being an Open Cloud Service The text classification model training apparatus 555 in the embodiments of the disclosure may be provided as a cloud service for information recommendation developed for users, provided for individuals, groups or units to obtain a recommendation list.

The text classification model training apparatus 555 includes a translation module 5551, a first training module 5552, a filtering module 5553 and a second training module 5554. The following will describe a text classification model training solution implemented by cooperation of the modules in the text classification model training apparatus 555 provided by an embodiment of the disclosure.

The translation module 5551 is configured to perform machine translation on a plurality of first text samples in a first language to obtain a plurality of second text samples corresponding to the plurality of first text samples one-to-one, the plurality of second text samples being in a second language different from the first language; The first training module 5552 is configured to train a first text classification model for the second language based on a plurality of third text samples in the second language and corresponding class labels. The filtering module 5553 is configured to perform confidence-based filtering on the plurality of second text samples by the trained first text classification model. The second training module 5554 is configured to train a second text classification model for the second language based on the filtered second text samples, the network depth of the second text classification model being greater than that of the first text classification model.

In some embodiments, the first training module 5552 is further configured to train the first text classification model for a $t^{th}$ time based on the plurality of third text samples in the second language and corresponding class labels; perform confidence-based filtering on the plurality of second text samples for the $t^{th}$ time by the first text classification model trained for the $t^{th}$ time; train the first text classification model for a $t+1^{th}$ time based on the filtering results oft times of training, the plurality of third text samples and corresponding class labels; and use the first text classification model trained for a $T^{th}$ time as the trained first text classification model; t being a sequentially increasing positive integer in a value range of $1 \leq t \leq T-1$, and T being an integer greater than 2 for indicating the total number of iterative training times.

In some embodiments, the second training module 5554 is further configured to determine distributions of the filtered second text samples in a plurality of classes; from text samples in each class in the filtered second text samples, randomly extracting text samples corresponding to the number threshold of the class to construct a training set in a case that the distributions of the filtered second text samples in the plurality of classes meet a distribution equilibrium condition, and the number in each class exceeds a corresponding number threshold of the class; and train a second text classification model for the second language based on the training set.

In some embodiments, the second training module 5554 is further configured to expand based on synonyms the second text samples in the classes with less distributions (or less distribution) in a case that the distributions of the filtered second text samples in a plurality of classes do not meet a distribution equilibrium condition, the distributions of the expanded second text samples in a plurality of classes meeting the distribution equilibrium condition; construct a training set based on the expanded second text samples; and train a second text classification model for the second language based on the training set.

In some embodiments, the second training module 5554 is further configured to construct a training set based on the plurality of third text samples and the filtered second text samples, and train a second text classification model for the second language based on the training set.

In some embodiments, the second training module 5554 is further configured to traverse each class of the filtered second text samples, and perform the following processing: randomly extract third text samples in the same class from the plurality of third text samples to supplement the second text samples in the same class, to update the filtered second text samples in a case that the number of the second text samples in a class is less than the number threshold of the class; and construct a training set based on the updated filtered second text samples.

In some embodiments, the second training module 5554 is further configured to determine a target number of samples matching the computing power that may be used for training the second text classification model according to the correspondence between the computing power of the text classification model and the number of text samples that may be operated in a unit time; and filter out text samples corresponding to the target number of samples as samples for training the second text classification model for the second language from the training set constructed based on the filtered second text samples.

In some embodiments, the first training module 5552 is further configured to predict the plurality of third text samples in the second language by the first text classification model to obtain the confidence of predicted classes corresponding to the plurality of third text samples; build a loss function of the first text classification model based on the confidence of the predicted classes and the class labels of the third text samples; and update the parameters of the first text classification model until the loss function converges, and use the updated parameters of the first text classification model when the loss function converges as the parameters of the trained first text classification model.

In some embodiments, the first training module 5552 is further configured to perform the following processing on any third text sample of the plurality of third text samples: perform the following processing by the first text classification model: encode the third text sample to obtain an encoding vector of the third text sample; fuse the encoding vector of the third text sample to obtain a fusion vector; and nonlinearly map the fusion vector to obtain the confidence of the predicted class corresponding to the third text sample.

In some embodiments, the first text classification model includes a plurality of cascaded activation layers; and the first training module 5552 is further configured to map the fusion vectors by the first activation layer of the plurality of cascaded activation layers; output the mapping result of the first activation layer to the subsequent cascaded activation layer, and continue mapping by the subsequent cascaded activation layer and outputting the mapping result until the mapping result is outputted to the last activation layer; and using the activation result outputted by the last activation layer as the confidence of the predicted classes corresponding to the third text samples.

In some embodiments, the filtering module 5553 is further configured to perform the following processing on any second text sample of the plurality of second text samples: predict the second text sample by the trained first text classification model to obtain the confidence of a plurality of predicted classes corresponding to the second text sample; determine the class label of the first text sample corresponding to the second text sample as the class label of the second text sample; and use the second text sample exceeding a confidence threshold as the filtered second text sample based on the confidence of the plurality of predicted classes corresponding to the second text sample and the class label of the second text sample.

In some embodiments, the second training module 5554 is further configured to predict the second text sample by the trained first text classification model to obtain the confidence of a plurality of predicted classes corresponding to the second text sample; build a loss function of the second text classification model based on the predicted classes corresponding to the filtered second text samples and the corresponding class labels; and update the parameters of the second text classification model until the loss function converges, and use the updated parameters of the second text classification model when the loss function converges as the parameters of the trained second text classification model.

In some embodiments, the second text classification model includes a plurality of cascaded encoders; and the second training module 5554 is further configured to perform the following processing on any text sample in the filtered second text samples: encode the text sample by the first encoder of the plurality of cascaded encoders; output the encoding result of the first encoder to the subsequent cascaded encoder, and continue encoding by the subsequent cascaded encoder and outputting the encoding result until the encoding result is outputted to the last encoder; use the encoding result outputted by the last encoder as the encoding vector corresponding to the text sample; and nonlinearly map the encoding vector of the text sample to obtain the predicted class corresponding to the text sample.

In some embodiments, the second training module 5554 is further configured to perform the following processing by the $y^{th}$ encoder of the plurality of cascaded encoders: perform self-attention processing on the encoding result of the $y-1^{th}$ encoder to obtain the $y^{th}$ self-attention vector; perform residual connection on the $y^{th}$ self-attention vector and the encoding result of the $y-1^{th}$ encoder to obtain the $y^{th}$ residual vector; nonlinearly map the $y^{th}$ residual vector to obtain the $y^{th}$ mapping vector; and perform residual connection on the $y^{th}$ mapping vector and the $y^{th}$ residual vector, use the result of the residual connection as the encoding result of the $y^{th}$ encoder, and output the encoding result of the $y^{th}$ encoder to the $y+1^{th}$ encoder; y being a sequentially increasing positive integer in a value range of $2 \leq y \leq H-1$, and H being an integer greater than 2 for indicating the number of the plurality of cascaded encoders.

An embodiment of the disclosure further provides a text classification apparatus, the text classification apparatus including an acquisition module and a processing module, the acquisition module being configured to acquire a text to be classified, the text to be classified being in a second language different from the first language; and the processing module being configured to encode the text to be classified by a second text classification model with a network depth greater than that of a first text classification model, to obtain an encoding vector of the text to be classified, and nonlinearly map the encoding vector of the text to be classified, to obtain the class corresponding to the text to be classified; the second text classification model being obtained by training text samples in the second language filtered by the first text classification model, and the text samples in the second language being obtained by performing machine translation on text samples in the first language.

An embodiment of the disclosure provides a computer program product or a computer program, the computer program product or the computer program including computer instructions, the computer instructions being stored in a computer-readable storage medium. A processor of an electronic device reads the computer instructions from the computer-readable storage medium, and the processor executes the computer instructions, to cause the computer device to perform the foregoing text classification model training method, or text classification method according to the embodiments of the disclosure.

An embodiment of the disclosure further provides a computer-readable storage medium storing executable instructions, the executable instructions, when executed by a processor, causing the processor to perform an AI-based information recommendation method, or text classification method, for example, the text classification model training method as shown in FIGS. 3-5, provided by the embodiments of the disclosure.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (comprising a compiled or interpreted language, or a declarative or procedural language) by using the form of a program, software, a software module, a script or code, and may be deployed in any form, comprising being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

Example embodiments of the disclosure have the following technical benefits. Second text samples in a second language different from a first language are acquired by machine translation, and the second text samples are filtered by a first text classification model, thereby automatically acquire cross-language text samples, and solving the problem caused by lack of text samples. Moreover, a second text classification model is trained by the filtered high-quality text samples, so that the second text classification model may perform accurate text classification and improve the accuracy of the text classification.

The foregoing descriptions are merely embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A text classification model training method, comprising:

performing machine translation on a plurality of first text samples in a first language to obtain a plurality of second text samples in a second language that is different from the first language;

training a first text classification model for the second language based on a plurality of third text samples in the second language and corresponding class labels;

performing confidence-based filtering on the plurality of second text samples by the trained first text classification model; and training a second text classification model for the second language based on the filtered second text samples, a network depth of the second text classification model being greater than a network depth of the first text classification model, wherein the training the first text classification model comprises, for a third text sample among the plurality of third text samples:

encoding the third text sample to obtain an encoding vector of the third text sample;

fusing the encoding vector of the third text sample to obtain a fusion vector; and nonlinearly mapping the fusion vector to obtain a confidence of a predicted class corresponding to the third text sample.

2. The method according to claim 1, wherein the training the first text classification model comprises:

training the first text classification model for a $t^{th}$ time based on the plurality of third text samples in the second language and the corresponding class labels;

performing confidence-based filtering on the plurality of second text samples for the $t^{th}$ time by the first text classification model trained for the $t^{th}$ time;

training the first text classification model for a $t+1^{th}$ time based on filtering results of t times of training, the plurality of third text samples and the corresponding class labels; and using the first text classification model trained for a $T^{th}$ time as the trained first text classification model;

t being a sequentially increasing positive integer in a value range of $1 \le t \le T-1$, and T being an integer greater than 2 and indicating a total number of iterative training times.

3. The method according to claim 1, wherein the training the second text classification model comprises:

determining that distributions of the filtered second text samples in a plurality of classes meet a distribution equilibrium condition and a number of the filtered second text samples in each class exceeds a corresponding number threshold of each class;

from the filtered second text samples in each class, randomly extracting the filtered second text samples corresponding to a number threshold of each class, to construct a training set; and training the second text classification model for the second language based on the training set.

4. The method according to claim 1, wherein the training the second text classification model comprises:

based on distributions of the filtered second text samples in a plurality of classes not meeting a distribution equilibrium condition, expanding, based on synonyms, the second text samples in a first class with a less even distribution;

constructing a training set based on the expanded second text samples, a distribution of the expanded second text samples in the first class meeting the distribution equilibrium condition; and training the second text classification model for the second language based on the training set.

5. The method according to claim 1, wherein the training the second text classification model comprises:

constructing a training set based on the plurality of third text samples and the filtered second text samples, and training the second text classification model for the second language based on the training set.

6. The method according to claim 5, wherein the constructing the training set comprises traversing each class of the filtered second text samples, and performing the following operations:

based on a number of the filtered second text samples in a class being less than a number threshold of the class, randomly extracting third text samples in a same class from the plurality of third text samples to supplement the second text samples in the same class, to update the filtered second text samples; and constructing the training set based on the updated filtered second text samples.

7. The method according to claim 1, further comprising, prior to the training the second text classification model:

determining a target number of samples matching a computing power based on a correspondence between a computing power of a text classification model and a number of text samples capable of being operated in a unit time; and filtering out text samples corresponding to the target number from a training set to be used in training the second text classification model.

8. The method according to claim 1, wherein the training the first text classification model further comprises:

predicting, by the first text classification model, the plurality of third text samples in the second language, to obtain a confidence of predicted classes corresponding to the plurality of third text samples;

building a loss function of the first text classification model based on the confidence of the predicted classes and the corresponding class labels of the plurality of third text samples; and updating parameters of the first text classification model until the loss function converges, and using updated parameters of the first text classification model when the loss function converges as parameters of the trained first text classification model.

9. The method according to claim 1, wherein the first text classification model comprises a plurality of cascaded activation layers;

the nonlinearly mapping comprises:

mapping fusion vectors by a first activation layer of the plurality of cascaded activation layers;

outputting a mapping result of the first activation layer to a subsequent cascaded activation layer, and continuing mapping by the subsequent cascaded activation layer and outputting a mapping result until the mapping result is outputted to a last activation layer of the plurality of cascaded activation layers; and using an activation result outputted by the last activation layer as the confidence of the predicted classes corresponding to the plurality of third text samples.

10. The method according to claim 1, wherein the performing the confidence-based filtering comprises performing the following operations on a second text sample of the plurality of second text samples:

predicting the second text sample by the trained first text classification model to obtain the confidence of a plurality of predicted classes corresponding to the second text sample;

determining a class label of a first text sample corresponding to the second text sample as a class label of the second text sample; and using the second text sample exceeding a confidence threshold as a filtered second text sample based on the confidence of the plurality of predicted classes corresponding to the second text sample and the class label of the second text sample.

11. The method according to claim 1, wherein the training the second text classification model comprises:

predicting, by the second text classification model, the filtered second text samples, to obtain the predicted classes corresponding to the filtered second text samples;

building a loss function of the second text classification model based on the predicted classes corresponding to the filtered second text samples and the corresponding class labels; and updating parameters of the second text classification model until the loss function converges, and using updated parameters of the second text classification model when the loss function converges as parameters of the trained second text classification model.

12. The method according to claim 11, wherein the second text classification model comprises a plurality of cascaded encoders; and the predicting the filtered second text samples comprises performing the following operations on a filtered second text sample in the filtered second text samples:

encoding the filtered second text sample by a first encoder of the plurality of cascaded encoders;

outputting an encoding result of the first encoder to the a subsequent cascaded encoder, and continuing encoding by the subsequent cascaded encoder and outputting an encoding result until the encoding result is outputted to a last encoder of the plurality of cascaded encoders;

using an encoding result outputted by the last encoder as an encoding vector corresponding to a text sample; and nonlinearly mapping the encoding vector of the text sample to obtain the predicted class corresponding to the text sample.

13. The method according to claim 12, wherein the continuing the encoding comprises performing the following operations by a $y^{th}$ encoder of the plurality of cascaded encoders:

performing self-attention processing on an encoding result of a $y-1^{th}$ encoder to obtain a $y^{th}$ self-attention vector;

performing residual connection on the $y^{th}$ self-attention vector and the encoding result of the $y-1^{th}$ encoder to obtain a $y^{th}$ residual vector;

nonlinearly mapping the $y^{th}$ residual vector to obtain a $y^{th}$ mapping vector; and performing residual connection on the $y^{th}$ mapping vector and the $y^{th}$ residual vector, using a result of the residual connection as an encoding result of the $y^{th}$ encoder, and outputting the encoding result of the $y^{th}$ encoder to a $y+1^{th}$ encoder;

y being a sequentially increasing positive integer in a value range of $2 \leq y \leq H-1$, and H being an integer greater than 2 and indicating a number of the plurality of cascaded encoders.

14. A non-transitory computer-readable storage medium, storing executable instructions, the executable instructions, when executed by at least one processor, causing the at least one processor to perform the method according to claim 1.

15. A text classification method, the method comprising:

acquiring a text to be classified, being in a second language different from a first language;

encoding the text to be classified by a second text classification model with a network depth greater than a network depth of a first text classification model, to obtain an encoding vector of the text to be classified; and nonlinearly mapping the encoding vector of the text to be classified, to obtain a class corresponding to the text to be classified;

the second text classification model being trained using second text samples in the second language filtered by the first text classification model, and the second text samples in the second language being obtained by performing machine translation on first text samples in the first language, the first text classification model being trained using third text samples in the second language and corresponding class labels, the first text classification model being trained by, for a third text sample among the plurality of third text samples:

encoding the third text sample to obtain an encoding vector of the third text sample;

fusing the encoding vector of the third text sample to obtain a fusion vector; and nonlinearly mapping the fusion vector to obtain a confidence of a predicted class corresponding to the third text sample.

16. An electronic device, comprising:

at least one memory, configured to store executable instructions; and at least one processor, configured to execute the instructions stored in the memory to perform the method according to claim 15.

17. A non-transitory computer-readable storage medium, storing executable instructions, the executable instructions, when executed by at least one processor, causing the at least one processor to perform the method according to claim 15.

18. A text classification model training apparatus, comprising:

at least one memory configured to store program code; and at least one processor configured to read the program code and operate as instructed by the program code, the program code comprising:

translation code configured to cause the at least one processor to perform machine translation on a plurality of first text samples in a first language to obtain a plurality of second text samples in a second language that is different from the first language;

first training code configured to cause the at least one processor to train a first text classification model for the second language based on a plurality of third text samples in the second language and corresponding class labels;

filtering code configured to cause the at least one processor to perform confidence-based filtering on the plurality of second text samples by the trained first text classification model; and second training code configured to cause the at least one processor to train a second text classification model for the second language based on the filtered second text samples; a network depth of the second text classification model being greater than a network depth of the first text classification model, wherein the first training code configured to cause the at least one processor to train the first text classification model by performing, for a third text sample among the plurality of third text samples:

encoding the third text sample to obtain an encoding vector of the third text sample;

fusing the encoding vector of the third text sample to obtain a fusion vector; and nonlinearly mapping the fusion vector to obtain a confidence of a predicted class corresponding to the third text sample.

19. The apparatus according to claim 18, wherein the second training code is configured to cause the at least one processor to construct a training set based on the plurality of third text samples and the filtered second text samples, and train the second text classification model for the second language based on the training set.

* * * * *